Nov. 4, 1930.　　H. KATTWINKEL　　1,780,710
FRICTION BODY FOR FRICTION COUPLINGS, BRAKES, AND THE LIKE
Filed Jan. 30, 1928
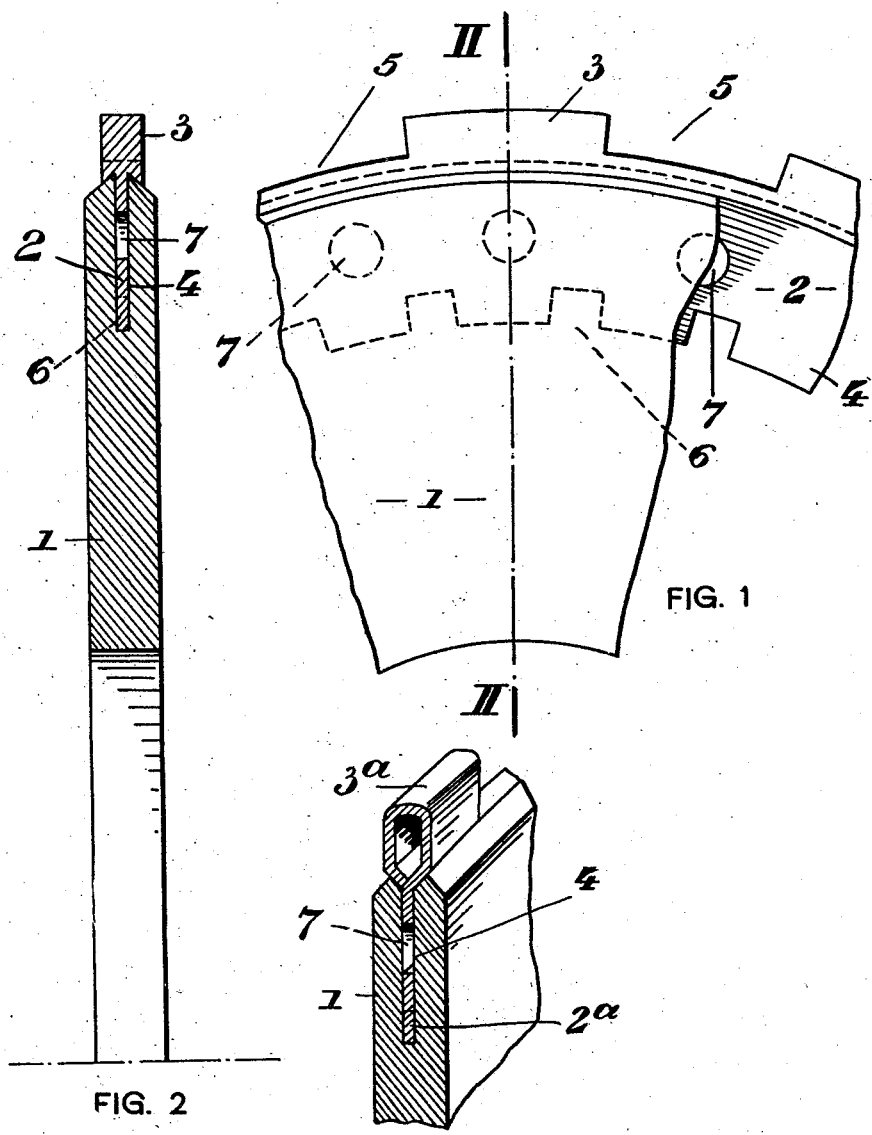

Patented Nov. 4, 1930

1,780,710

UNITED STATES PATENT OFFICE

HANS KATTWINKEL, OF COSWIG, GERMANY

FRICTION BODY FOR FRICTION COUPLINGS, BRAKES, AND THE LIKE

Application filed January 30, 1928, Serial No. 250,635, and in Germany January 26, 1927.

My invention relates to friction members for clutches, brakes, etc., said members consisting of a frictional material, such as a hardened mixture of a fibrous material and a phenolic condensation product, and having metal teeth or driving projections which are partly embedded into the said frictional material while the same is still in a plastic condition.

A main object of my invention is the avoidance or the decrease of the influence of the driving forces on the frictional material. Other objects of my invention will be apparent from the following specification.

In the accompanying drawing two constructional forms of the friction member according to my invention are illustrated. In the drawing Fig. 1 is a lateral view of a cut-away portion of a friction member according to my invention, Fig. 2 is a section taken along the line II—II of Fig. 1, while Fig. 3 is a perspective view, partly in section, showing a modified construction of the toothed rim of the friction member according to my invention.

Referring now more particularly to the drawing, the reference numeral 1 designates the friction member which may be made from a proper mass by pressing, said mass consisting for instance in a mixture of asbestos fibers and a phenolic condensation product. The moulding of the said mixture is effected, after a toothed rim 2 has been embedded into the frictional mass, while the same is still in a plastic condition.

According to Figs. 1 and 2 the toothed rim consists essentially of two annular parts, of which the outer part 3 is of considerably greater thickness than the inner part 4. The toothed rim may, for instance, be turned out of a steel disc. At the points where the outer part 3 merges into the inner part 4, the toothed rim is preferably dovetailed in cross-section, as may be seen especially from Fig. 2. At certain distances notches 5 are worked out of the part 3, as shown in Fig. 1, the teeth of the rim being thus produced. The annular part 4 may be provided at its internal periphery with notches 6 and perforations 7 to enhance the adhesion between the mass of the friction-disc and the ring 3.

According to Fig. 3 the rim $2^a$ consists of an annular piece of sheet metal the outer parts of which are folded around to form the reinforced teeth $3^a$. As according to the invention all the teeth or driving projections of the friction members are worked out of a single endless annular piece, the frictional material of the member is not or is not considerably influenced by the driving forces acting in a peripheral direction.

In all cases the radial breadth of the metallic rim 2, that is the radial distance between its inner and outer edges, will be considerably smaller than the radial distance between the inner and outer edges of the annular friction member 1. Hence, the weight of the complete friction member including the metallic rim will be considerably reduced as compared with the known friction members of the kind described in which the metallic supporting rim extends radially to the inner edge of the friction member proper.

I claim:—

1. A friction element comprising a disc of frictional material, and a metal rim provided with a plurality of driving projections and forming a single endless annular piece which is partly embedded into said frictional material, the driving projections of said rim being formed by folding around the respective portions of the rim.

2. A friction member comprising an annular disc of frictional material and a single endless annular metallic rim of considerably smaller radial breadth embedded in said disc and having spaced driving lugs projecting outwardly beyond the periphery of said disc, said lugs forming integral portions of said rim.

3. A friction member comprising an annular disc of frictional material and a single endless annular metallic rim of considerably smaller radial breadth embedded in the outer peripheral part of said disc and having spaced driving lugs projecting outwardly beyond the periphery of said disc, said lugs forming integral portions of said rim.

4. A friction member comprising an annular disc of frictional material and a single endless annular metallic rim of considerably smaller radial breadth embedded in said disc and having spaced driving lugs projecting outwardly beyond the periphery of said disc, said lugs forming integral portions of said rim and being of larger thickness than the embedded portion of the rim.

5. A friction member comprising an annular disc of frictional material, the inner portion of said disc being solid in cross section, the outer portion having a groove extending around said disc and being open to the periphery, a metallic rim of smaller breadth than said disc embedded in said groove and having driving lugs formed integral with it and projecting outwardly beyond the periphery of said disc.

6. A friction member comprising a single annular disc of frictional material and a single annular metallic rim of considerably smaller radial breadth embedded in said disc and having integral therewith spaced driving lugs projecting outwardly beyond the periphery of said disc.

In testimony whereof I affix my signature.

HANS KATTWINKEL.